United States Patent

[11] 3,607,668

[72] Inventor William Rodger Williamson
Waterford, Conn.
[21] Appl. No. 774,801
[22] Filed Nov. 12, 1968
[45] Patented Sept. 21, 1971
[73] Assignee AMF Incorporated

[54] CONCENTRATED BRINE-INCOMING FEED VAPOR COMPRESSION DESALINATION SYSTEM
10 Claims, 2 Drawing Figs.

[52] U.S. Cl................................................. 203/11,
202/173, 203/24, 203/26
[51] Int. Cl...................................................... B01d 3/06
[50] Field of Search........................................... 202/173,
235, 174, 23; 203/11, 24, 26, 100

[56] References Cited
UNITED STATES PATENTS
2,389,789 11/1945 Latham.......................... 203/24 X

| | | | |
|---|---|---|---|
| 3,152,053 | 10/1964 | Lynam........................ | 202/173 |
| 3,288,685 | 11/1966 | Kemper et al. ............... | 203/24 X |
| 3,433,717 | 3/1969 | Loebel ......................... | 202/173 |
| 3,388,045 | 6/1968 | Goeldner et al. ............. | 203/11 X |
| 3,489,652 | 1/1970 | Williamson................... | 203/11 |
| 3,501,384 | 3/1970 | Starmer........................ | 203/11 |
| 2,759,882 | 8/1956 | Worthen et al. .............. | 203/24 X |
| 3,305,455 | 2/1967 | Loebel ......................... | 202/173 X |
| 3,362,458 | 1/1968 | Hopper ........................ | 203/26 X |

Primary Examiner—Norman Yudkoff
Assistant Examiner—David Edwards
Attorneys—George W. Price and Murray Schaffer ABSTRACT: A multistage flash distillation system wherein heated feed water is passed through successively lower stages to flash into vapor, which vapor is condensed as distillate, the effluent brine from the lowest stage being passed to a boiler to produce steam, which steam is compressed and so utilized to heat the incoming feed.

INVENTOR.
WILLIAM RODGER WILLIAMSON
BY
ATTORNEY

CONCENTRATED BRINE-INCOMING FEED VAPOR COMPRESSION DESALINATION SYSTEM

The present invention relates to the method and apparatus for distilling sea water and producing fresh water therefrom.

The main object of the present invention is to provide a simple, economical evaporator of the multistage flash type in which the heat transferred to and found in the final distillate product is employed as a source for heating the incoming or raw salt water to evaporation temperature.

It is another object to provide an evaporator of the multistage flash type in which the distillate vapor of the final stages is employed to impart heat to the feed water entering the flash chamber of the first stage.

It is another object of this invention to provide an evaporator of the multistage flash type having characteristics of operation superior to those presently in existence.

Another specific object of this invention is to provide evaporators in which the gained output ratios of operation are far superior to those presently obtainable. The gained output ratio being defined as the ratio of the amount of distillate produced to the amount of power (generally steam) needed to produce such distillate. The amounts are generally stated in terms of pounds per hour (0/hr.).

Briefly, the present method and apparatus comprises the compression of distillate vapor from the flash evaporation of brine exiting from the bottom or lowest end of a multistage cycle in which compressed vapor is employed to power a sea feed heater imparting heat to the feed.

The system of the present invention eliminates a number of problems generally associated with "high economy" distillation plants. First, fewer flash stages are required to effect total production, reducing complexity, cost and size of vessels. Sub-atmospheric stages are eliminated permitting the entire system to be operated at the more efficient pressures above atmosphere. The present system eliminates the need for highly sensitive control of interstage flow and thermal equilibrium since it is not necessary to maintain small temperature and pressure differentials between stages. Further, all evaporation stages of the present device lie between the sea feed heater and the brine reboiler. Above all, the present method provides for a quantitative and qualitative drop in initial power (steam) required to operate the system. This gives rise to geometric increases in Gained Output Ratios (GOPR).

These advantages and objects as well as others will be seen from the accompanying description in which reference is made to the appended drawing wherein.

Figure 1:
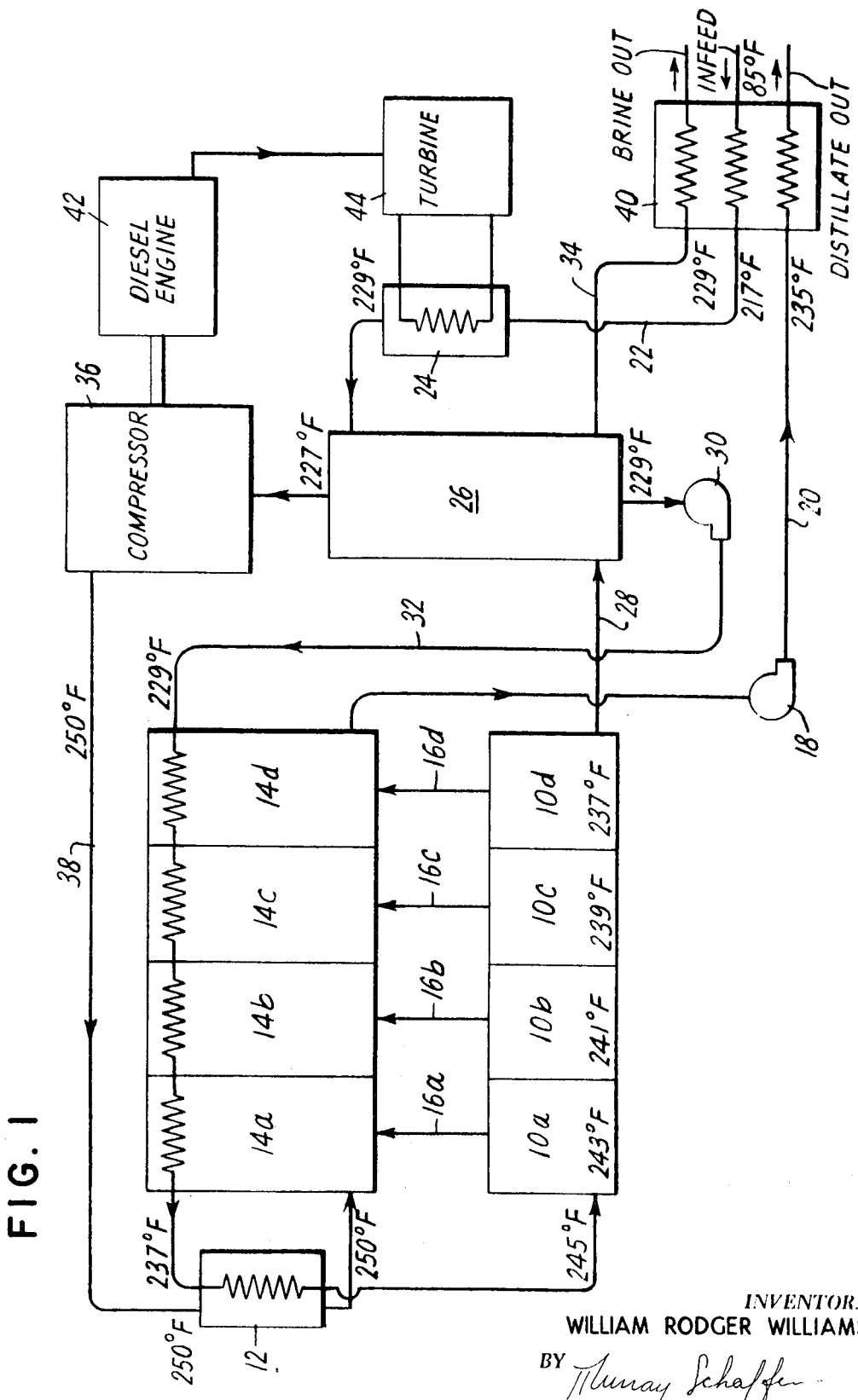
FIG. 1 is a schematic view depicting one form of the present invention.

In FIG. 1, a multistage evaporator of the conventional type like that of U.S. Pat. No. 3,186,924 is shown comprising a plurality of flash chambers $10a$–$10d$ which operate at successively lower pressures and temperatures proceeding from a high pressure stage $10a$ to the lowest pressure stage $10d$. As heated sea water is introduced successively from a sea feed heater 12 into the flash chamber 10, a portion thereof flashes into vapor which passes into a heat recovery chamber $14a$–$14d$, respectively, through lines $16a$–$16d$. The condensed vapors are collected from the condenser chambers and are removed by a distillate pump 18 to exit through line 20. Raw sea water feed makeup is delivered by line 22 through an external heat supply, steam heat exchanger 24, which constitutes the sole source of power not inherent in the system. The external heat source may be raw steam, turbine exhaust or any other suitable and available heat source. The raw sea water then passes into a heat reject flash chamber or reboiler 26 where a portion flashes into vapor and the remainder passes into and comingles the effluent unflashed brine exiting via pipe 28, from the flash chambers $10a$–$10d$. A portion of the brine and raw sea feed is passed via pump 30 and line 32 to the condenser coils of condensing chamber 14 to act as the condensing media for the vapor flashed in chambers $10a$–$10d$. The brine feed is then passed through heater 12 where it is heated and fed into flash chambers $10a$–$10d$.

A portion of the effluent brine from flash chambers $10a$–10 is bled from the reboiler 26 and blown down via line 34.

The vapor formed in reboiler 26 from the effluent brine and the raw sea feed is completely compressed in compressor 36 and is fed via line 38 to the heater 12 where it imparts its heat to the feed water. The compressed vapor condenses to liquid and passes into the collecting trays of the condenser chambers to mix with the fluid and exit via line 20.

The reboiler is a conventional flash device without condensing section attached. The compressor 36 is a conventional compressor of moderate size and design sufficient only to compress the volume of vapor created in the boiler so as to evaluate its temperature by approximately one-sixth–one-tenth that of the temperature of the sea feed or brine in the boiler.

Since the reboiler is outside the bottom end of the multistage system its' brine effluent is sufficiently cool to constitute proper cooling media for condensation without modification of the pressure-temperature differentials of the stages $10a$–$10bq$. In accordance with established evaporation principles the flow of condensing fluid is countercurrent to the flow of sea feed through the flash chambers.

As is the usual practice a distillate cooler or brine preheater 40 may be provided to cool the blowdown exiting from line 34 and the distillate from line 20 while simultaneously preheating the raw sea water infeed.

Omission has been made here of the details concerning the structure of the individual stages and their linkage since such details are now quite commonly known. Reference, however, may be made to the aforementioned U.S. Pat. No. 3,186,922 or to U.S. Pat. No. 3,399,118 and U.S. Pat. applications Ser. Nos. 615,743, 615,572 and 440,493, all in the name of the present inventor, now U.S. Pat. Nos. 3,513,075; 3,489,650; and 3,418,213, respectively.

A typical operating scheme as a shipboard evaporator is depicted in FIG. 1 which will be employed to illustrate the operative advantages of the present invention. Raw sea water, at ambient temperatures which in most latitudes approximates 85° F., is fed into the system via line 22. The temperature of this infeed is raised by transfer of the heat from the brine blowdown and effluent distillate to approximately 217° F. whence it then enters into the external heat source exchanger 24 which may be conveniently powered from the waste heat of a diesel engine 42 running the ship. The waste heat may be fed directly to the heat exchanger 24 or first through a heat recovery unit 44 which increases its operating effect. The infeed temperature is raised in heat exchanger 24 to 299° F. which, as will be appreciated, is rather a small differential. The power requirement for only a 12° F. raise in temperature is rather small and will require only a portion of the ship's waste heat.

On leaving the heat exchanger 24, the infeed enters into the reboiler as a spray and a portion flashes into vapor at approximately 227° F. The remainder and unflashed infeed is mixed with the unspent brine exiting from the last stage at 237° F., where it is recirculated to the condenser coils as the condenser fluid for each of the chambers $14a$–$14d$. The temperature of this fluid increases as the flash vapor condenses so that the media exits from chamber $14a$ at 237° F. whence it passes through heater 12 on its way to the flash chamber $10a$. Simultaneously, the vapor produced in the reboiler 26 is compressed by compressor 36 until its temperature reaches 250° F. Such change in temperature, it will also be appreciated, does not require great compression and can be accomplished easily and simply with economical equipment. The compressed vapor is fed to the heater 12 where its heat is transferred to the brine condensing fluid to raise its temperature from 237° F. to approximately 245° F. as it enters the flash chamber $10a$.

The compressor 36 may be driven in a variety of ways, such as by diesel or petrol engine, steam or gas turbine, or electric motor. In many cases diesel engine drive will be most convenient, because the diesel can also drive an electric generator to produce the power needed to drive the pumps on the equipment. Further, the diesel will produce sufficient waste heat from its exhaust gases and jacket water to operate heat exchanger 24. In this way the diesel fuel will be the only external supply of fuel, or heat or power, and this arrangement will be particularly useful when a self-contained installation is required.

When a steam supply is available, the compressor could be turbine driven or alternatively could be of the jet compressor type. The choice would be dependent upon available steam conditions, and the quantity and pressure of process steam that could be used from the compressor exhaust, since only part of the jet compressor discharge would be needed by the feed heater.

The process described eliminates a number of the problems generally associated with high economy from distillation plants. Very few flash stages are required, reducing the complexity, cost and size of the main vessel, and eliminating the subatmospheric stages. In orthodox flash units it is necessary for good economy to have low temperature stages operative with small temperature differences, and this feature causes difficult interstage flow and thermal equilibrium problems, which are, as has been seen, avoided here.

The device shown in FIG. 1 can be constructed of 4 flash chambers having a total flash surface in flash chambers of approximately 9200 square feet, producing at the rate of 5.5 lbs. distillate per hour per square foot or a the total of 100 gallons per minute, all at a gained output ratio of better than 10 to 1.

Figure 2:
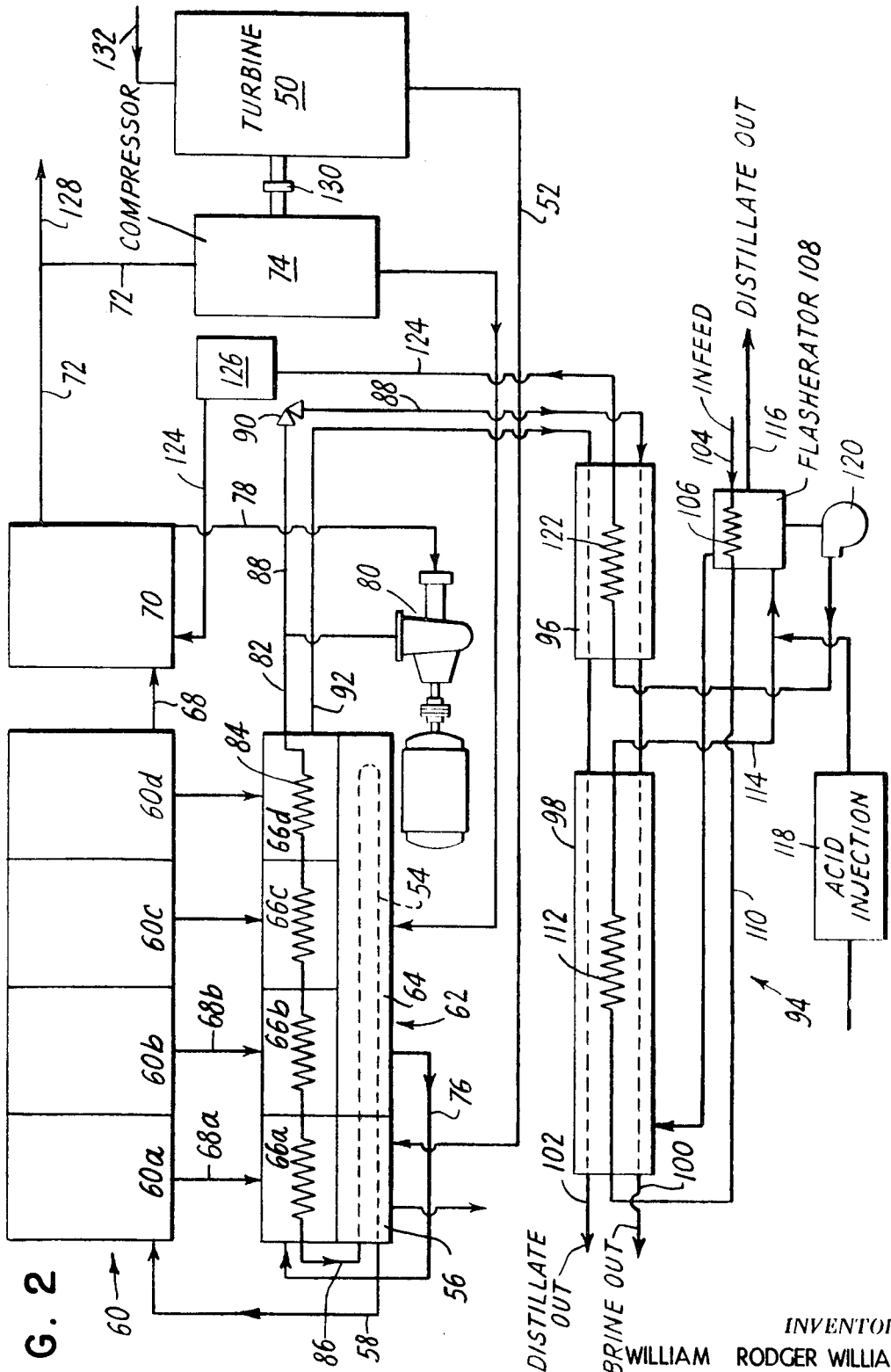
FIG. 2 is a schematic view of a modified form of the present invention.

FIG. 2 indicates a modified version of the present invention which is combined with certain subsidiary flash evaporation techniques to provide a suitable land based system with small power requirement and high yield.

In the embodiment illustrated in FIG. 2 of the drawings, a source of heat energy, such as a steam powered turbine 50 supplies heat through a conduit 52 to heat exchange coils 54 in a brine or feed solution heater 56. The solution to be distilled is fed through coils 54 in the heater 56 via line 58 to the flash chambers of a multistage flash evaporator 60. The heater 56 is part of a generally larger heat exchange unit 62 which includes a section 64 sealed from section 56 but through which the coils 54 also extend.

The flash evaporator 60 includes a plurality of flash chambers 60a–60d which operate at successively lower pressures and temperatures proceeding from a high pressure stage 60a to a low pressure stage 60d. As the heated brine is introduced via line 58 successively through the flash chambers 60a–60d, a portion thereof flashes into vapor passing through lines 64 for condensation in heat recovery condensers 66a–66d. The unflashed brine exits from the low end flash chamber 60d through line 68 into a relatively large heat reject flash chamber or reboiler 70. Vapors produced in the heat reject flash chamber 70 are passed as low pressure steam via line 72 to a compressor 74 which compresses the vapor, thereby causing an increase in its temperature. The compressed vapor is passed into the heater section 64 of the heat exchange unit 62 to impart its heat to the media flowing through coils 54. This compressed vapor consequently changes to distillate and is fed, via pipe 76, to condensers 66a–66d to mix with the distillate formed therein.

The effluent brine not vaporized in reboiler 70 is passed via line 78, pump 80 and line 82 into the coils 84 of the condensing chambers 66a–66d where it acts as the condensing media for the vapor created in the flash chambers 60a–60d. The media passes counter to the flow of brine and exits from the high end condenser 66a into coils 54 of the heat exchange unit via line 86. A portion of the brine effluent from reboiler 70 is blown down via line 88 branching off from pump 80 as required. A level sensing device 90 is provided for this effect. Distillate exiting from the low end condenser 66d passes outwardly via pipe 92. Both blowdown and distillate pass independently and cooperatively through a brine heater and distillate cooler generally designated 94.

The brine heater and distillate cooler 94 comprises a feed heater 96 and a regenerative flash heater 98, both of which have evaporator and condenser sections. The brine blowdown from pipe 88 passes first into the evaporator of feed heater 96 thence through the evaporator of the regenerative flash heater 98 where some degree of flashing and production of distillate occurs. The residual brine exits via pipe 100 and is dumped back into the sea. The distillate passing from the low end condenser 66d through pipe 92 passes successively through the condenser sections of the feed heater 96 and regenerative flash unit 98 and is further cooled and mixed with the distillate flash of those units finally exiting via pipe 102 for collection as pure water.

The condenser sections of the regenerative flash unit 98 and the feed heater 96 are supplied with cooling media which itself is the incoming feed supply of raw sea water for the entire system. Consequently, raw sea water is fed from the source via a pipe 104 through the condensing coil 106 of a flashaerator device 108 thence via pipe 110 to the condensing coil 112 of the regenerative flash unit 98, where on cooling the distillate becomes warm. The raw sea water feed exits from the regenerative flash unit through a pump (not shown) via line 114 to be fed as the distillant into the Flashurator 108 wherein it is flashed, condensed and withdrawn via line 116 to be used as desired.

If desired, the raw sea feed entering into the flashaerator 108 may be treated with acid injection via mechanism 118 whereby scale formation, etc. may be inhibited as is currently well known from reference to the patents to Andrew Checkovitch U.S. 3,218,241 and 3,119,572.

The flashaerator device is, of course, employed primarily to deaerate and pretreat the incoming raw sea feed.

The unflashed raw sea feed is withdrawn from the flashaerator via pump 120 and is fed as the condensing media to the coil 122 of the feed heater from whence it is fed via line 124 into the flash chamber of the reboiler 70 to mix with the brine exiting from the low end flash chamber 60d. Feed water is thus continually entering into the system to maintain the system supplied at equilibrium and constant cycle. If desired, an external heat source 126 is interposed in line 124 to provide any extra heat required by the system which is not furnished endothermically by the system or by the turbine 50 heat supply.

Finally, provision is made via line 128 to remove, if desired, a portion of the reboiler vapor to use as live steam whenever such is required. For example, if the system is installed in a resort hotel, the extra steam may be used in the laundry facilities. Also, the compressor 74 is operated by the turbine 50 through shaft 130 consequently reducing the power requirement. Steam for the turbine can be obtained for normal sources and delivered via pipe 132.

The system shown in FIG. 2 operates and functions with similar results to the system shown in FIG. 1. It is believed unnecessary to provide the operational parameters with regard to FIG. 2 since they would of course be comparable to those shown in FIG. 1. The system shown in FIG. 2 is advantageous since its power supply can be obtained from the available sources located either as a part of the site of installation or closely adjacent thereto. Such auxiliary functions as acid treatment, sea feed, heating regeneration, etc. are also available with the system of FIG. 2.

It will now be seen that the objectives and advantages enumerated above are clearly obtainable with the present system which is susceptible to a number of modifications and changes. Accordingly, it is intended that the preceding disclosure is by way of example only and that the invention should be limited only to the appended claims.

What I claim is:

1. A flash evaporator comprising a plurality of stages operable at successively lower pressures to establish a high pressure stage at one end of said evaporator and a low pressure stage at the other end thereof, whereby heated feed solution introduced into said high pressure stage passes serially through said stages to said low pressure stage and a portion of said feed solution flashes into vapor in each of said stages; means to pass feed solution into said high pressure stage; means to condense the vapors produced in said flash evaporator stages to provide a distillate product; means defining a heat reject flash chamber to receive concentrated feed solution from said low pressure stage and heated raw sea water feed and produce steam, means for compressing said steam and heat recovery means for transferring the heat of said steam to said feed solution.

2. The evaporator according to claim 1 including means for withdrawing compressed steam exhausted from said heat recovery means and mixing said compressed steam with the condensed vapors produced in said evaporator.

3. A flash evaporator according to claim 1 including heat generating means and conduit means to sequentially pass said feed solution in heat exchange relationship with said heat generating means to said heat rejection means wherein a portion of said feed solution is converted to steam in the low pressure stage of said flash evaporator condensing means and acts in said flash evaporator condensing means as the condensing media and then passes to the high pressure stage flash evaporator to flash into vapor.

4. An evaporator according to claim 3 including means for withdrawing unflashed feed solution from said evaporator, means for withdrawing distillate from said condensing means, both said withdrawing means being in heat exchange relationship with the conduit means for passing feed solution to the heat generating means whereby said feed solution may be preheated.

5. A method of desalinating sea water comprising the steps of passing heated sea water feed solution serially through successively lower pressure stages of a multistage flash evaporator to produce a vapor fraction and a brine fraction, condensing said vapor fraction to produce a distillate and withdrawing said distillate passing said brine fraction to a boiler to convert a portion thereof along with a portion of heated raw sea water feed into steam passing the remainder of said brine fraction of said heated sea water feed to waste, compressing said steam to increase its temperature, passing said compressed steam into heat exchange relationship with said feed solution to transfer the heat thereof to said feed solution.

6. The method according to claim 5 including the step of condensing said compressed steam and mixing the same with said condensed vapor fraction.

7. The method recited in claim 5 comprising the further steps of preheating raw sea water to form a part of said feed solution by passing it in heat exchange relation with said distillate product and with said brine portion discharged to waste and then treating said preheated raw sea water to remove corrosive agents therefrom.

8. The method recited in claim 7 in which said raw sea water is preheated to temperatures in excess of 200° F.

9. The method recited in claim 7 in which said treating step comprises injecting acid into said preheated raw sea water to remove $HCO_3$ ions therefrom, and then deaerating the acid treated sea water to remove $CO_2$ and air therefrom.

10. The method recited in claim 9 in which said treated sea water is mixed with a brine fraction produced in said flash evaporator to form said feed solution.